UNITED STATES PATENT OFFICE.

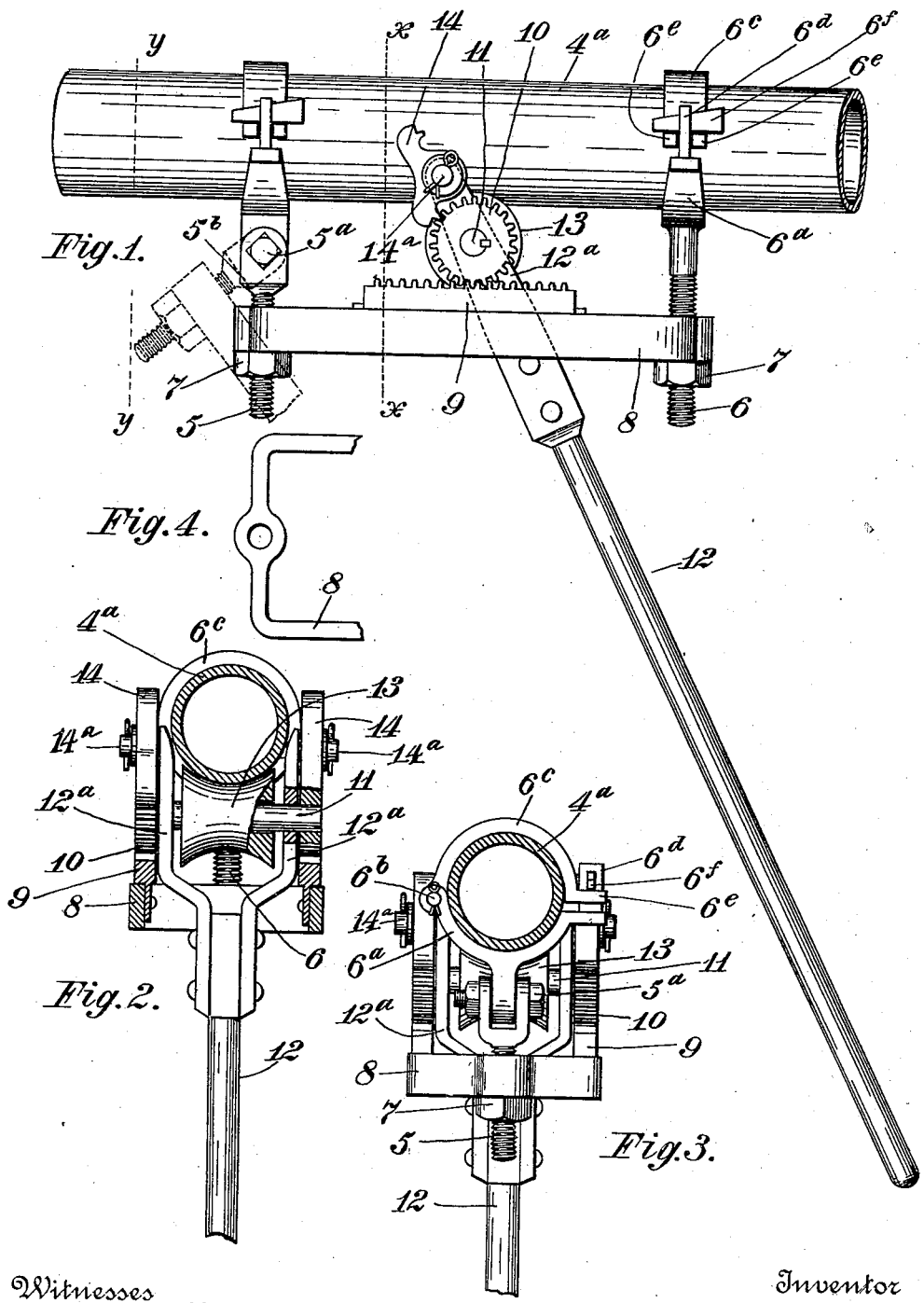

MELVIN BERLIN, OF COLUMBUS, OHIO.

DEVICE FOR REMOVING EXCRESCENCES FROM PIPES.

980,914.         Specification of Letters Patent.     Patented Jan. 10, 1911.

Application filed April 13, 1910. Serial No. 555,165.

*To all whom it may concern:*

Be it known that I, MELVIN BERLIN, a citizen of the United States, residing at Columbus, in the county of Franklin and State of Ohio, have invented a certain new and useful Improvement in Devices for Removing Excrescences from Pipes, of which the following is a specification.

The object of this invention is to provide a simple, cheap and effective device for reducing excrescences on pipes, tubes or other rod-like bodies so as to impart to them a smooth, regular and normal appearance.

The most important use of the invention contemplated at this time is the reduction of excrescences on boiler tubes. The primary cause of such excrescences I understand to be the internal accumulation of lime in spots thereby permitting the excessive heating of the metal of the tube at such spots and consequently the softening and expulsion by the boiler pressure of the metal of the tube at such spots.

The invention is embodied in the construction and combination of parts shown in the accompanying drawings, set forth in the following description and pointed out in the appended claims.

In the drawings—Figure 1 is a view in side elevation showing the device applied to a piece of pipe or tube. Fig. 2 is a vertical section on the line $x$—$x$ looking to the right. Fig. 3 is a vertical section on the line $y$—$y$ looking to the right. Fig. 4 is a plan view of one end of the tool supporting frame.

In the views $4^a$ designates the tube or pipe to be treated and 5 and 6 designate threaded hangers which are adapted to be attached or hung upon such pipe or tube by any suitable means. In the instance shown the screw 6 has its shank formed with a yoke $6^a$ to fit against one side of the pipe or tube, and to one arm of this yoke is hinged, in the manner as shown at $6^b$ Fig. 3 a strap $6^c$ that fits around the opposite side of the tube while the other arm of the yoke is provided with slotted ear $6^d$ straddled by forks $6^e$ of the strap $6^c$. A pin $6^f$ inserted in the ear $6^d$ serves to lock the strap to the yoke. The screw 5 is attached to the tube in the same way but the shank of the screw is divided at $5^b$ to form a knuckle and provided with a hinge pin $5^a$ so that the frame and operative parts can be swung down and turned around on the screw 5 to operate on another part of the pipe without removing the connecting devices of said screw 5.

Upon adjustable nuts 7 on the screws 5 and 6 is supported a rectangular frame 8. The longer sides of the frame 8 are provided with two rectilinear racks 9, and engaged with these racks are two toothed wheels or spur gears 10 having an axle 11 keyed to them.

12 is a long lever having fork arms $12^a$, $12^a$, fulcrumed preferably on the axle between the spur gears 10. On the axle between the fork arms is journaled preferably loosely, a pressing roller 13. The upper end of each fork arm $12^a$, $12^a$, has an outwardly projecting stud bearing $14^a$ on which is loosely pivoted a double or two-armed dog 14 each arm or pawl of which has a tooth adapted to engage the gear 10 to turn that gear when the pawl is moved in one direction but to slip over the gear when moved in the opposite direction. The lower arm of the lever 12 is made rather long so as to afford a powerful leverage and the pawls are operated by oscillating said lever.

In practice the device is secured substantially as appears in Fig. 1 on a tube having an excrescence to be reduced and a trifle behind such excrescence. The frame 8 is adjusted upward by the nuts 7 to a plane where the excrescence will offer an obstruction to the movement of the pressing roller 13 under it. The pawl 14 is placed to engage that side of the gear 10 which, upon oscillation of the lever 12, will cause the pressing roller 13 to move under the excrescence. In this operation the gears 10 are forced to move in a direction to carry the pressing roller 13 under the excrescence by reason of the racks 9 which prevent the gears from slipping backward. The pressing roller 13, therefore, acts somewhat like a wedge but with a rolling and squeezing contact against the excrescence thus forcing the latter toward the axis of the tube. To reduce a neighboring excrescence on the tube the device can oftentimes have its position properly altered to treat such excrescence by simply removing one of the hangers as before indicated and swinging the roller with its supporting frame and operating devices downward as suggested by dotted lines Fig. 1, and then swinging the frame around on the screw 5 to the new position on the opposite side of that screw.

It will be understood, of course, that a large or refractory excrescence can be gradually reduced that is by making repeated passes of the pressing roller against the excrescence and turning up the nuts 7 from time to time as the excrescence becomes reduced by the action of the roller.

Although it is practicable to reduce excrescences while in a cold state it facilitates the operation and secures better results to heat the excrescence to redness with a blow pipe while subjecting it to the action of the pressing roller.

What I claim is:

1. In means for reducing excrescences on tubes or other rod-like bodies, the combination of a pressing roller, an axle therefor, a toothed wheel secured to such axle, a rectilinear rack upon which such toothed wheel travels, a lever fulcrumed with reference to said axle, said lever carrying a pawl to engage and move said toothed wheel and means for securing said rack in fixed relation to the tube or rod-like body and the pressing roller in position to operate on the excrescence.

2. In means for reducing excrescences on tubes or other rod-like bodies, the combination of a pressing roller, an axle therefor on which the roller freely turns, a toothed wheel secured to such axle, a rectilinear rack upon which such toothed wheel travels, a lever fulcrumed with reference to said axle, said lever carrying a pawl to engage and move said toothed wheel, and means for securing said racks in fixed relation to the tube or rod like body and the pressing roller in position to operate on the excrescence.

3. In means for reducing excrescences on tubes or other rod like bodies, the combination of a pressing roller, an axle therefor, a toothed wheel secured to such axle, a rack upon which such toothed wheel travels, a lever fulcrumed with reference to said axle, said lever carrying a pawl to engage and move said toothed wheel and two means including screws 5 and 6 for securing said rack in fixed relation to the tube or rod-like body and the pressing roller in position to operate on the excrescence, one of said means including a hinge connection whereby the pressing roller and its supporting and operating devices can be swung away from the tube or rod when the other is detached.

4. In means for reducing excrescences on tubes or other rod-like bodies, the combination of a frame having means for attaching it to the tube or other rod-like body, a pressing roller supported on said frame, a lever mounted to swing with reference to said roller, a dog carried by said lever to move the pressing roller and means in connection with the roller and frame to guide the pressing roller in a right line, substantially as described.

MELVIN BERLIN.

Witnesses:
BENJAMIN FINCKEL,
MAYME FOARD.